(12) United States Patent
Takiguchi

(10) Patent No.: US 9,846,267 B2
(45) Date of Patent: Dec. 19, 2017

(54) OPTICAL OBSERVATION DEVICE

(71) Applicant: HAMAMATSU PHOTONICS K.K., Hamamatsu-shi, Shizuoka (JP)

(72) Inventor: Yuu Takiguchi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/651,364

(22) PCT Filed: Dec. 13, 2013

(86) PCT No.: PCT/JP2013/083510
§ 371 (c)(1),
(2) Date: Jun. 11, 2015

(87) PCT Pub. No.: WO2014/097996
PCT Pub. Date: Jun. 26, 2014

(65) Prior Publication Data
US 2015/0301256 A1    Oct. 22, 2015

(30) Foreign Application Priority Data
Dec. 20, 2012 (JP) .................. 2012-278184

(51) Int. Cl.
*G02B 5/32* (2006.01)
*G03H 1/08* (2006.01)
(Continued)

(52) U.S. Cl.
CPC .............. *G02B 5/32* (2013.01); *G02B 3/08* (2013.01); *G02B 5/18* (2013.01); *G02B 5/1814* (2013.01);
(Continued)

(58) Field of Classification Search
CPC ...... G02B 5/32; G02B 5/1876; G03H 1/0841; G03H 1/0005; G03H 2001/085; G03H 2001/005
See application file for complete search history.

(56) References Cited

U.S. PATENT DOCUMENTS

2011/0101203 A1*  5/2011  Cooper ................ G02B 21/245
                                              250/201.4
2012/0314206 A1   12/2012  Spizig et al.

FOREIGN PATENT DOCUMENTS

CN    1392962     1/2003
CN    102455501   5/2012
(Continued)

OTHER PUBLICATIONS

Machine translation of JP 11-326860, retrieved electronically from AIPN, Sep. 22, 2016.*
(Continued)

*Primary Examiner* — Thomas K Pham
*Assistant Examiner* — Cara Rakowski
(74) *Attorney, Agent, or Firm* — Drinker Biddle & Reath LLP

(57) ABSTRACT

An optical observation system includes a spatial light modulator displaying a Fresnel type kinoform on a phase modulation plane, and modulating light L1 in phase to irradiate an observation object with modulated light L2, an imaging optical system imaging observation target light L3 from the observation object, an optical system moving mechanism moving the imaging optical system in an optical axis direction of the observation target light L3, and a control section controlling the optical system moving mechanism such that the focal position of the imaging optical system changes in response to a change in the light condensing position of the modulated light L2 by the Fresnel type kinoform.

8 Claims, 9 Drawing Sheets

(51) Int. Cl.
  *G03H 1/00*     (2006.01)
  *G02B 5/18*     (2006.01)
  *G02B 21/00*    (2006.01)
  *G02B 21/36*    (2006.01)
  *G02B 3/08*     (2006.01)
(52) U.S. Cl.
  CPC ........... *G02B 21/00* (2013.01); *G02B 21/365* (2013.01); *G03H 1/0005* (2013.01); *G03H 1/0841* (2013.01); *G03H 2001/005* (2013.01); *G03H 2001/0094* (2013.01); *G03H 2001/085* (2013.01)

(56) References Cited

FOREIGN PATENT DOCUMENTS

| | | |
|---|---|---|
| EP | 1 865 354 | 12/2007 |
| JP | H11-326860 A | 11/1999 |
| JP | 2006-072279 A | 3/2006 |
| JP | 2010-266709 A | 11/2010 |
| JP | 2012-108491 A | 6/2012 |
| WO | WO-2011/131311 A1 | 10/2011 |

OTHER PUBLICATIONS

English-language translation of International Preliminary Report on Patentability (IPRP) dated Jul. 2, 2015 that issued in WO Patent Application No. PCT/JP2013/083510.
S. Hasegawa et al., "Holographic femtosecond laser processing with multiplexed phase Fresnel lenses", Optics Letters vol. 31 No. 11, 2006, p. 1705-p. 1707.

\* cited by examiner (a)

(b)

(a)

(b)

(a)

(b)

OPTICAL OBSERVATION DEVICE

TECHNICAL FIELD

The present invention relates to an optical observation system.

BACKGROUND ART

Patent Document 1 describes a laser scanning device using a wavefront conversion element capable of arbitrarily converting the wavefront shape of light. This laser scanning device includes a light beam branching element provided within an optical path of a laser light beam, a beam expander, the wavefront conversion element, an objective lens for condensing light onto a sample plane, a photodetector, and a control device. The wavefront conversion element consists of a liquid crystal element configured such that its minutely divided respective regions can be independently controlled by the control device.

CITATION LIST

Patent Literature

Patent Document 1: Japanese Patent Application Laid-Open No. H11-326860

SUMMARY OF INVENTION

Technical Problem

Recently, it has been studied to generate illumination light for an object in microscopy or laser light for use in laser processing by phase modulation using a spatial light modulator. According to such a light irradiation method, irradiation light having a desired intensity distribution in, for example, a circular ring shape, a rectangular ring shape, or a linear shape can be realized by controlling a phase distribution (hologram) in the spatial light modulator.

Further, in such a light irradiation method, the light condensing position in the optical axis direction of light after phase modulation (hereinafter, referred to as modulated light) can also be arbitrarily changed by controlling the phase distribution of the spatial light modulator. Thus, the modulated light can be condensed to an arbitrary depth of an observation object. However, in such a case where a portion irradiated with modulated light is observed or where an image of the portion is acquired, if the light condensing position changes in the depth direction as described above, the necessity for changing the focus of an observation optical image in response to the change in light condensing position arises, which makes the operation complicated.

The present invention has been made in view of the above problem, and an object thereof is to provide an optical observation system capable of easily obtaining an observation optical image of a irradiation portion even when the light condensing position of modulated light is changed in the optical axis direction.

Solution to Problem

In order to solve the above-described problem, an optical observation system according to the present invention is an optical observation system for imaging observation target light from an observation object, and includes a light source for outputting light, a spatial light modulator including a phase modulation plane including a plurality of two-dimensionally arrayed regions, and for displaying a Fresnel type kinoform on the phase modulation plane, modulating the light in phase in each of the plurality of regions to generate modulated light, and outputting the modulated light to the observation object, an imaging optical system for imaging the observation target light from the observation object, an optical system moving mechanism for moving the imaging optical system, and a control section for controlling the optical system moving mechanism such that a focal position of the imaging optical system changes in response to a change in light condensing position of the modulated light by the Fresnel type kinoform.

In this optical observation system, the optical system moving mechanism moves the imaging optical system that images observation target light from an observation object in the optical axis direction of an observation optical image. Moreover, the optical system moving mechanism is controlled by the control section such that the focal position of the imaging optical system changes in response to a change in the light condensing position of the modulated light due to a kinoform (typically, such that the focal position of the imaging optical system approximates the light condensing position of the modulated light). According to such a configuration, when the light condensing position of the modulated light changes in the optical axis direction, the observation optical image in an irradiation portion can be automatically focused without bothering an operator. Thus, according to the optical observation system described above, even when the light condensing position of the modulated light is changed in the optical axis direction, an observation optical image of the irradiation portion can be easily obtained.

Advantageous Effects of Invention

The optical observation system according to the present invention can easily obtain an observation optical image of a irradiation portion even when the light condensing position of modulated light is changed in the optical axis direction.

DESCRIPTION OF EMBODIMENTS

Hereinafter, embodiments of an optical observation system according to the present invention will be described in detail with reference to the accompanying drawings. In addition, in the description of the drawings, the same elements are denoted by the same reference symbols, and overlapping description will be omitted.

Figure 1:
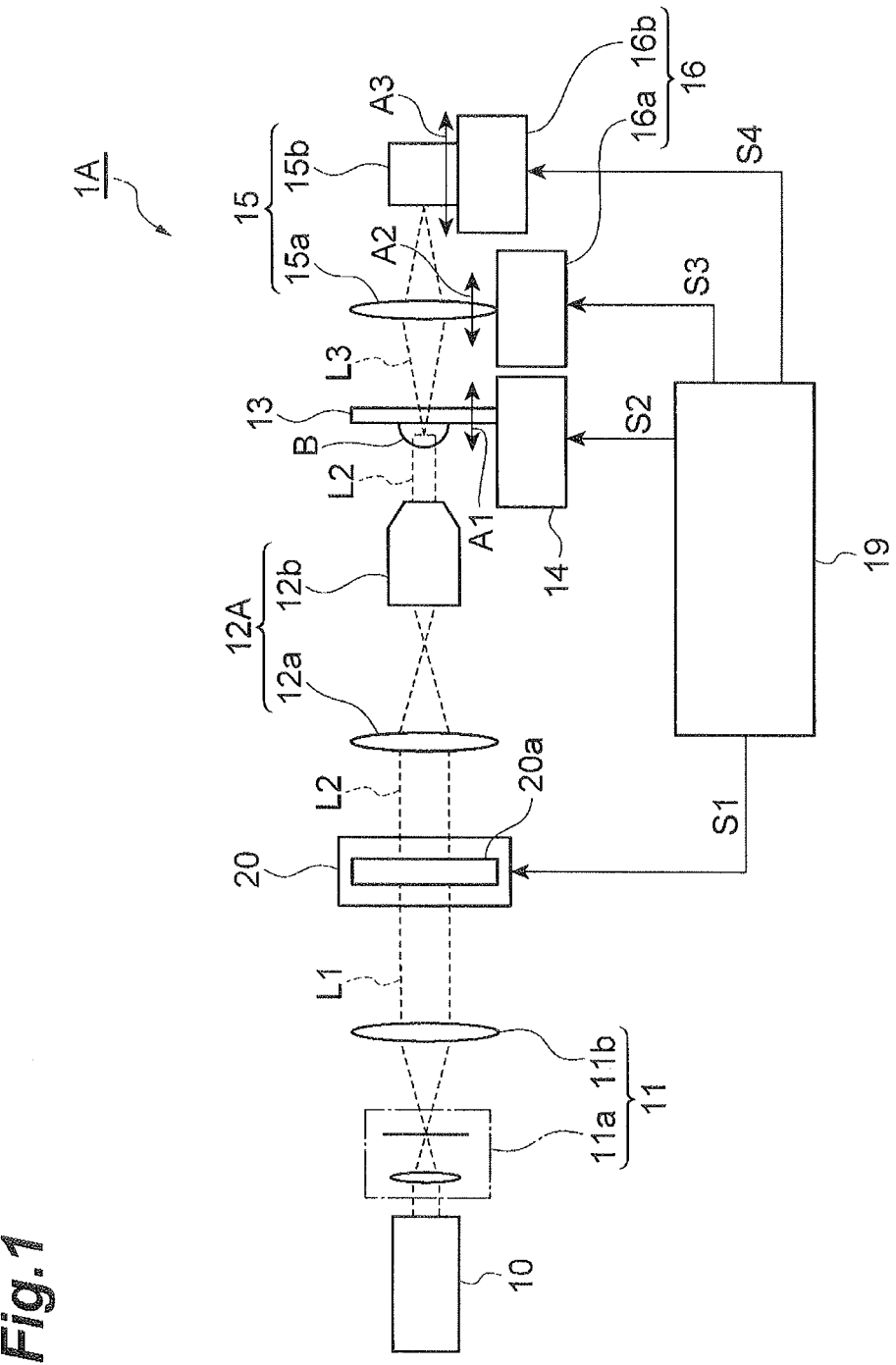
FIG. 1 is a view showing a configuration of an optical observation system according to an embodiment.

FIG. 1 is a view showing a configuration of an optical observation system 1A according to an embodiment of the present invention. In an example, the optical observation system 1A of the present embodiment is an optical observation system for imaging an observation object such as an optical microscope. Further, in another example, the optical observation system 1A is an optical observation system that processes a processing object by irradiating the processing object with laser light in laser processing and observes the state of a processed portion. In addition, in FIG. 1, an observation object as well as a processing object are shown as the observation object B.

As shown in FIG. 1, the optical observation system 1A includes a light source 10, a front optical system 11, a spatial light modulator (Spatial Light Modulator; SLM) 20, a rear optical system 12A, a stage 13 that supports the observation object B, a stage moving mechanism 14, an imaging optical system 15, an optical system moving mechanism 16, and a control section 19.

The light source 10 outputs light L1 having a predetermined wavelength. The light L1, preferably, is monochromatic and has some degree of coherence, and is, for example, laser light. Further, the light L1 may be low-coherence light such as light from an LED, but when a plurality of wavelength components are included in the light L1, correction by a color correction lens or the like is required in some cases.

The front optical system 11 is optically coupled to the light source 10, and guides the light L1 output from the light source 10 to the spatial light modulator 20. The front optical system 11 may include an optical system such as, for example, a beam expander or a spatial filter. Further, the front optical system 11 may include various optical components such as, for example, a beam splitter, a wave plate, a polarizer, and a lens. As an example, the front optical system 11 shown in FIG. 1 includes a spatial filter 11a and a collimator lens 11b.

The spatial light modulator 20 has a phase modulation plane 20a including a plurality of two-dimensionally arrayed regions, and generates modulated light L2 by modulating the light L1 in phase in each of the plurality of regions. On the phase modulation plane 20a, a Fresnel type kinoform is displayed according to a control signal S1 provided from the control section 19. In addition, the kinoform means spatial phase information. The spatial light modulator 20 irradiates the observation object B with modulated light L2 via the rear optical system 12A. A method for calculating a Fresnel type kinoform will be described later. In addition, spatial phase information for which a predetermined modulation pattern is superimposed on a Fresnel type kinoform may be displayed on the phase modulation plane 20a.

As the spatial light modulator 20, one of various types such as an electrically addressable liquid crystal element, an optically addressable liquid crystal element, and a deformable mirror type light modulator can be applied. Further, the spatial light modulator 20 of the present embodiment may be either of a transmission type and a reflection type.

Figure 2:
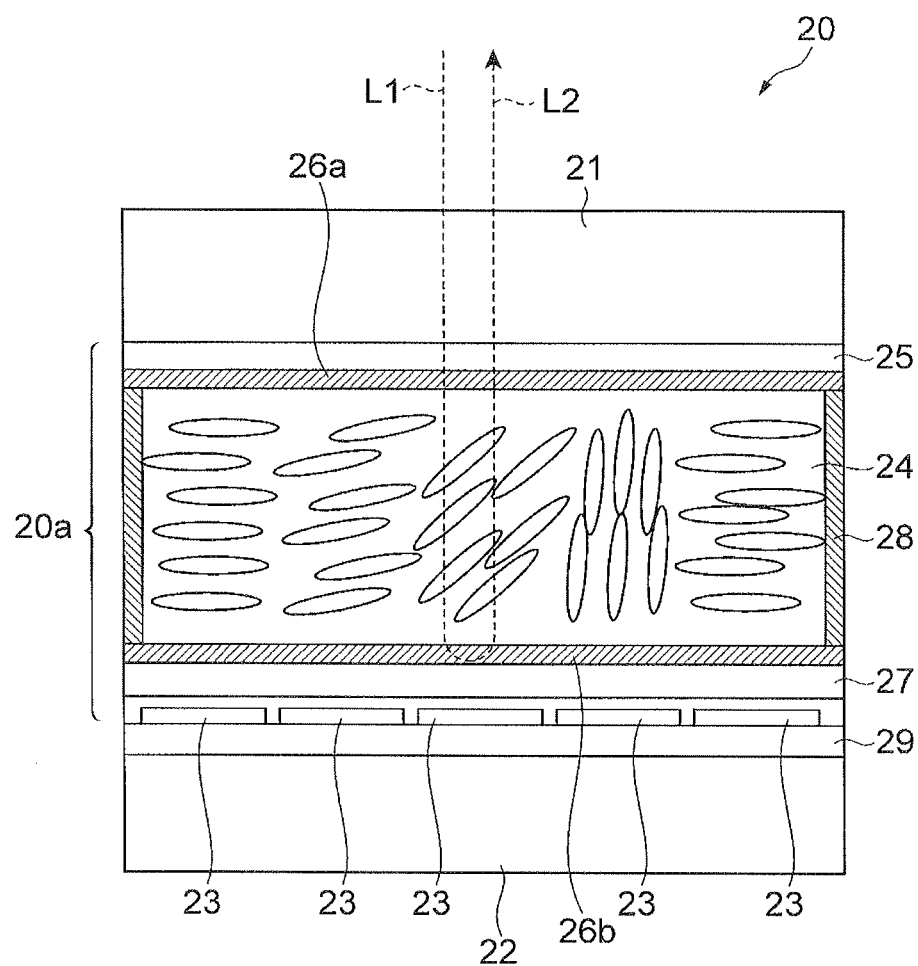
FIG. 2 is a sectional view schematically showing an LCoS type spatial light modulator as an example of a spatial light modulator.

FIG. 2 is a sectional view schematically showing an LCoS type spatial light modulator as an example of the spatial light modulator 20 of the present embodiment, and shows a section taken along an optical axis of the light L1. The spatial light modulator 20 includes a transparent substrate 21, a silicon substrate 22, a plurality of pixel electrodes 23, a liquid crystal layer 24, a transparent electrode 25, alignment films 26a and 26b, a dielectric mirror 27, and a spacer 28. Of these, the plurality of pixel electrodes 23, the liquid crystal layer 24, the transparent electrode 25, the alignment films 26a and 26b, and the dielectric mirror 27 constitute the phase modulation plane 20a.

The transparent substrate 21 is made of a material that transmits light L1, and disposed along a principal surface of the silicon substrate 22. The plurality of pixel electrodes 23 are arrayed in a two-dimensional grid pattern on the principal surface of the silicon substrate 22, and constitute the respective pixels of the spatial light modulator 20. The transparent electrode 25 is disposed on a surface of the transparent substrate 21 that is opposed to the plurality of pixel electrodes 23. The liquid crystal layer 24 is disposed between the plurality of pixel electrodes 23 and the transparent electrode 25. The alignment film 26a is disposed between the liquid crystal layer 24 and the transparent electrode 25, and the alignment film 26b is disposed between the liquid crystal layer 24 and the plurality of pixel electrodes 23. The dielectric mirror 27 is disposed between the alignment film 26b and the plurality of pixel electrodes 23. The dielectric mirror 27 reflects the light L1 having entered from the transparent substrate 21 and transmitted through the liquid crystal layer 24 so as to output again from the transparent substrate 21.

Further, the spatial light modulator 20 further includes a pixel electrode circuit (active matrix driving circuit) 29 that controls voltages to be applied between the plurality of pixel electrodes 23 and the transparent electrode 25. When voltage is applied to any pixel electrode 23 from the pixel electrode circuit 29, the refractive index of the liquid crystal layer 24 on the pixel electrode 23 changes according to the level of an electric field generated between the pixel electrode 23 and the transparent electrode 25. Thus, the optical path length of the light L1 that is transmitted through the relevant portion of the liquid crystal layer 24 changes, and accordingly, the phase of the light L1 changes. Moreover, by applying various levels of voltage to the plurality of pixel electrodes 23, a spatial distribution of the phase modulation amount can be electrically written, and various kinoforms can be displayed according to necessity. Thus, the minimum unit of regions that constitute the phase modulation plane 20a corresponds to the size of the pixel electrode 23.

FIG. 1 is referred to again. The rear optical system 12A has a front lens 12a and a rear lens 12b. The front lens 12a is a convex lens, and is optically coupled to the phase modulation plane 20a of the spatial light modulator 20. Further, the rear lens 12b is a so-called objective lens, and disposed between the front lens 12a and the observation object B, one surface is optically coupled to the front lens 12a, and the other surface is optically coupled to the observation object B. In addition, the rear lens 12b may be a convex lens. As a result of having such a configuration, the rear optical system 12A optically couples the phase modulation plane 20a and the observation object B.

The stage 13 supports the observation object B. The stage 13 of the present embodiment is made movable in an optical axis direction (arrow A1 in the figure) of the modulated light L2 by the stage moving mechanism 14, and as a result of such a movement of the stage 13, the observation object B moves in the optical axis direction of the modulated light L2. In addition, the stage moving mechanism 14 serves as an observation object moving mechanism in the present embodiment. The stage moving mechanism 14 moves the stage 13 with a direction (whether being the front direction or rear direction) and movement amount instructed by a control signal S2 provided from the control section 19.

The imaging optical system 15 is provided on an opposite side to the observation object B with respect to the stage 13 that supports the observation object B, and provided so as to acquire an image of observation target light L3 (observation optical image) transmitted through the observation object B and the stage 13.

The imaging optical system 15 includes an imaging lens 15a and a detector 15b. One surface of the imaging lens 15a is optically coupled to the observation object B, and the other surface is optically coupled to a photodetecting plane of the detector 15b. The imaging lens 15a forms an image of the observation target light L3 transmitted through the observation object B, toward the detector 15b. Further, the detector 15b takes an optical image of the observation target light L3 regarding the observation object B and generates image data. The detector 15b may be any of a one-dimensional sensor, a two-dimensional image sensor, and a spectroscope, or may use these at the same time. In addition, if the detector 15b is a one-dimensional sensor, a pinhole may be provided between the imaging lens 15a and the detector 15b to constitute a confocal system. Further, between the imaging lens 15a and the detector 15b, an optical system such as a relay lens or an optical component such as a filter may be provided.

The optical system moving mechanism 16 is a mechanism for moving the imaging optical system 15 along an optical axis direction of the observation target light L3 in the imaging optical system 15. The optical system moving mechanism 16 includes a mechanism 16a for moving the imaging lens 15a along the optical axis direction (arrow A2 in the figure) of the observation target light L3 in the imaging lens 15a and a mechanism 16b for moving the detector 15b along the optical axis direction (arrow A3 in the figure) of the observation target light L3 in the detector 15b. The mechanism 16a moves the imaging lens 15a with a direction (whether being the front direction or rear direction) and movement amount instructed by a control signal S3 provided from the control section 19. The mechanism 16b moves the detector 15b with a direction (whether being the front direction or rear direction) and movement amount instructed by a control signal S4 provided from the control section 19. In addition, the optical system moving mechanism 16 may be provided as a mechanism that moves either one of the imaging lens 15a or the detector 15b in the optical axis direction.

The control section 19 provides a control signal S1 regarding a Fresnel type kinoform to the spatial light modulator 20 such that the observation object B is irradiated with modulated light L2 having a desired sectional shape. Here, as an example of a method for calculating a Fresnel type kinoform to be displayed on the spatial light modulator 20, a calculation method by reverse propagation will be described.

In the present embodiment, a reconstruction image plane of the modulated light L2 modulated by the spatial light modulator 20 is set so as to overlap the observation object B. If it is assumed that a pattern (target pattern) of the modulated light L2 on the reconstruction image plane is composed of M (here, M is an integer of 2 or more) point light sources, a hologram plane in the phase modulation plane 20a can be handled as a sum of wavefront propagation functions from the respective point light sources.

Moreover, where the coordinates of each point light source in the reconstruction image plane are provided as $(x_m, y_m)$ (here, m=0, 1, . . . , M−1), a wavefront propagation function $u_m$ $(x_a, y_b)$ of each point light source at the coordinates $(x_a, y_b)$ (here, a, b=0, 1, . . . , N−1, N is the number of pixels in the x-direction or y-direction) of each pixel of the hologram plane is expressed as in the following formula (1).

[Formula 1]

$$u_m(x_a, y_b) = \frac{1}{r_m} \exp\left[-i\left\{k\sqrt{(x_a - x_m)^2 + (y_b - y_m)^2 + z^2} + \delta(x_a, y_b)\right\}\right] \equiv \\ A_m \cdot \exp(-i\theta_m) \quad (1)$$

Here, i is an imaginary unit, k is a wavenumber ($=2\pi/\lambda$, $\lambda$ is the wavelength of the modulated light L2), z is a distance between the reconstruction image plane and the hologram plane, $A_m$ is a complex amplitude component (i.e., the intensity of light), $\theta_m$ is a phase component, and $\delta$ is an initial phase in each pixel.

Further, $r_m$ is a numerical value defined by the following formula (2),

[Formula 2]

$$r_m = \sqrt{(x_a - x_m)^2 + (y_b - y_m)^2 + z^2} \quad (2)$$

and represents a distance from each point light source within the reconstruction image plane to each pixel of the hologram plane.

In the present method, a sum total $u_{total}$ $(x_a, y_b)$ of the wavefront propagation functions $u_m$ regarding the M point light sources is determined by the following formula (3).

[Formula 3]

$$u_{total}(x_a, y_b) = \sum_{m}^{M-1} A_m \cdot \exp(-i\theta_m) \quad (3)$$

Then, by extracting a phase component from the sum total $u_{total}$ $(x_a, y_b)$, a kinoform by a computer generated hologram (Computer Generated Hologram; CGH) is prepared.

In addition, extracting a phase component here is for disregarding amplitude information included in the wavefront propagation function $u_m$ because the spatial light modulator 20 is a phase modulation type spatial light modulator. Further, at this time of calculation, it is necessary to limit the function region of the wavefront propagation function $u_m$ such that a return line of phase wrapping does not exceed a Nyquist frequency, i.e., such that in a phase term $\exp(-i\theta_m)$ of the wavefront propagation function $u_m$, a phase difference from a neighboring pixel does not exceed $\pi$(rad).

Figure 3:
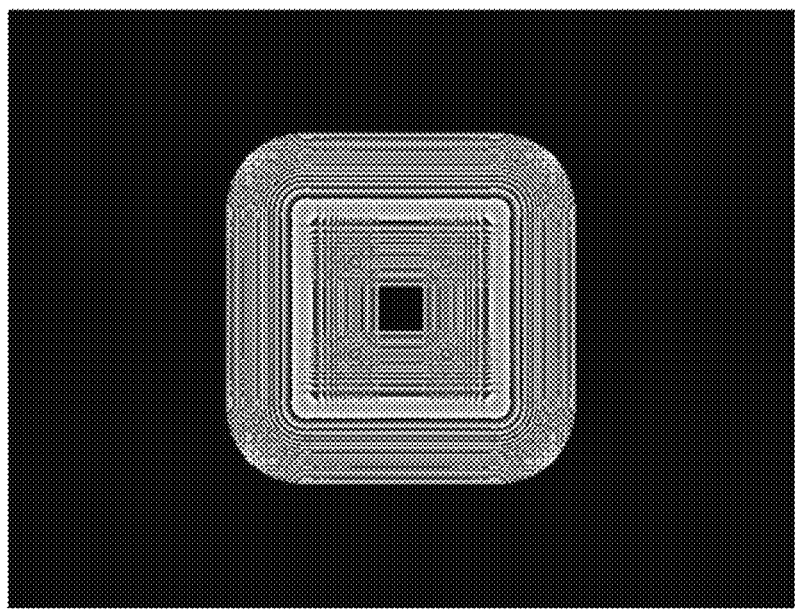
FIG. 3 includes (a) an image showing an example of a Fresnel type kinoform calculated by a calculation method of an embodiment, and (b) a view showing a shape of modulated light with which an observation object is irradiated according to the kinoform.
Figure 3:
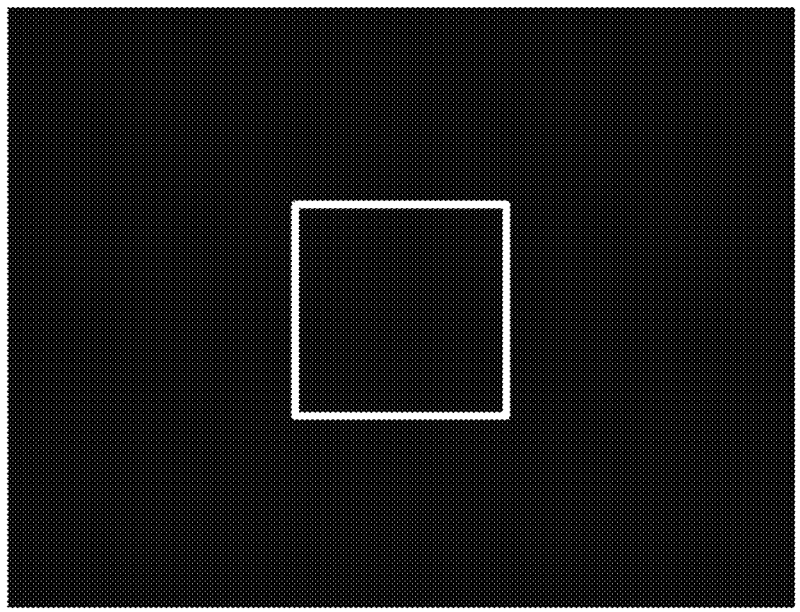
Figure 4:
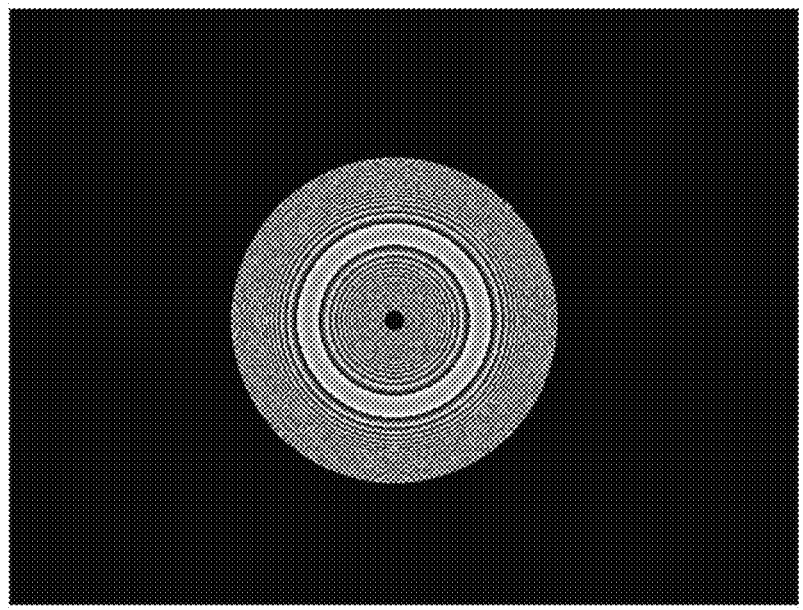
FIG. 4 includes (a) an image showing an example of a Fresnel type kinoform calculated by a calculation method of an embodiment, and (b) a view showing a shape of modulated light with which an observation object is irradiated according to the kinoform.
Figure 4:
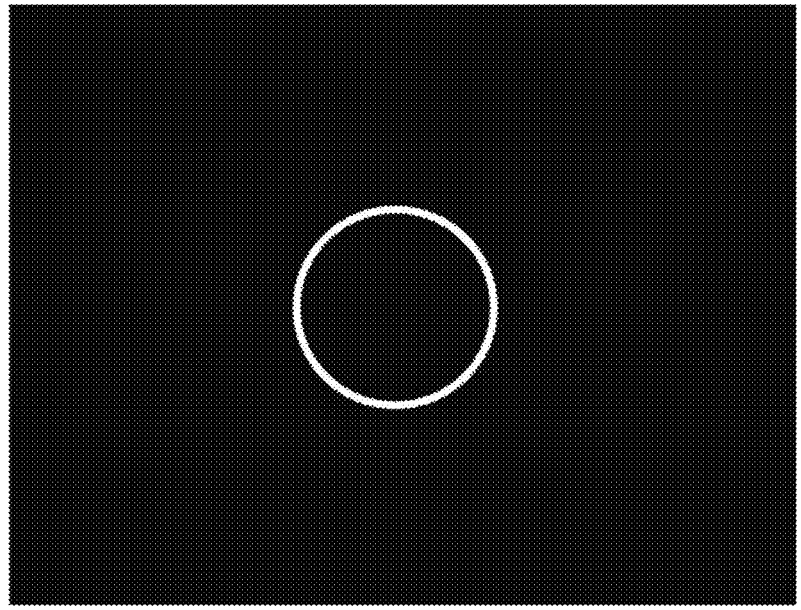
Figure 5:
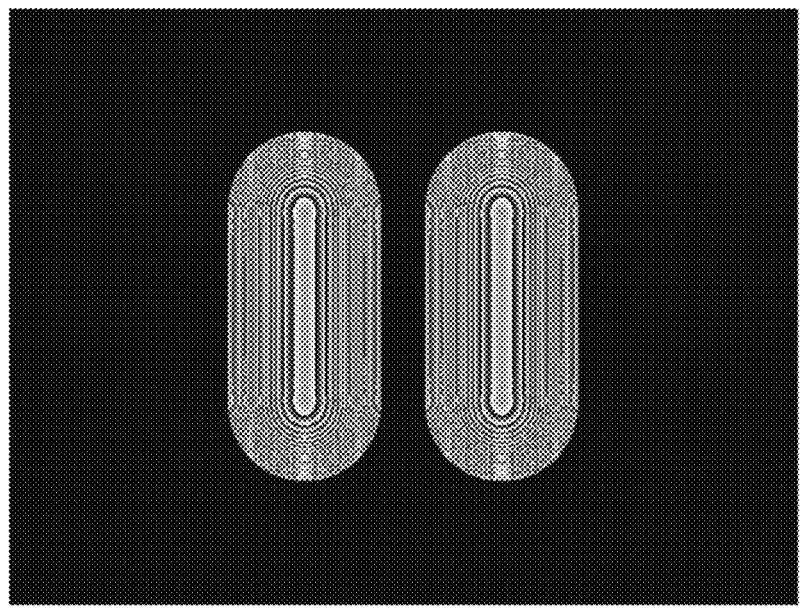
FIG. 5 includes (a) an image showing an example of a Fresnel type kinoform calculated by a calculation method of an embodiment, and (b) a view showing a shape of modulated light with which an observation object is irradiated according to the kinoform.
Figure 5:
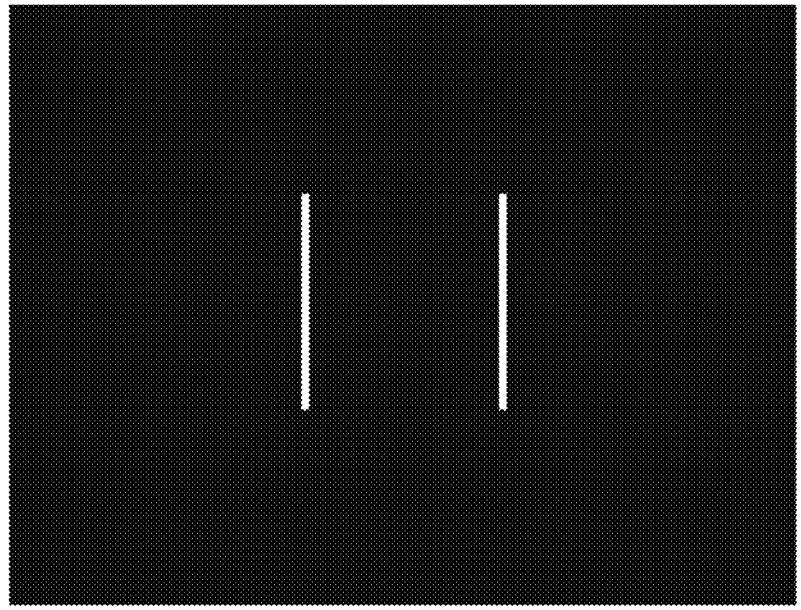

FIG. 3 to FIG. 5 include (a) images showing Fresnel type kinoforms calculated by the calculation method described above, and (b) views showing shapes (sectional shapes perpendicular to the optical axis) of modulated light L2 with which the observation object B is irradiated according to those kinoforms. FIG. 3 shows a case where the shape of modulated light on the observation object B is a rectangular shape. FIG. 4 shows a case where the shape of modulated light on the observation object B is a circular shape. FIG. 5 shows a case where the shape of modulated light on the observation object B is a linear shape of two straight lines that are parallel to each other.

According to the calculation method described above, it is possible to provide the Fresnel type kinoform to be displayed on the phase modulation plane 20a as a kinoform that, like those, makes the shape of modulated light L2 on the observation object B a circular shape, a rectangular shape, or a linear shape. In addition, the shape of modulated light L2 on the observation object B is not limited to these, and can be various shapes.

Figure 6:
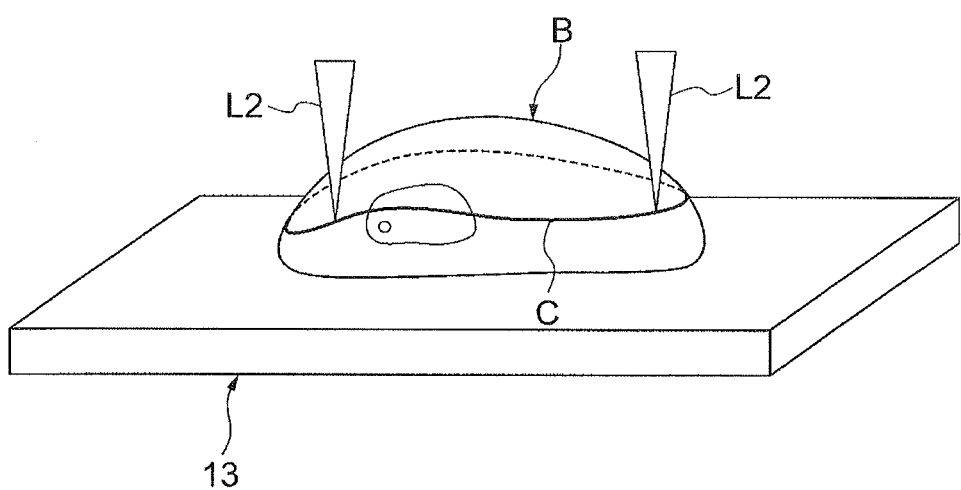
FIG. 6 is a view conceptually showing a state of three-dimensionally irradiating modulated light onto an observation object.

Further, by use of the calculation method described above, a kinoform that allows three-dimensionally irradiating modulated light L2 onto an observation object B can also be calculated. FIG. 6 is a view conceptually showing a state of three-dimensionally irradiating modulated light L2 onto an observation object B (for example, a cell). The solid line C shown in the figure indicates a portion for which modulated light L2 is irradiated on the surface of the observation object B.

In addition, in the calculation method described above, making the light intensity in a central portion of a light intensity distribution on the reconstruction image plane smaller than the light intensity in a surrounding portion of the light intensity distribution allows maintaining a sufficient numerical aperture (NA) while adjusting the irradiation light amount. Further, the light intensity $A_m$ may be adjusted in distribution by an iteration method that performs computational or experimental feedback.

Further, in the calculation method described above, the numerical aperture (NA) may be changed to an extent such as not to exceed a Nyquist frequency. The light intensity of the modulated light L2 with which the observation object B is irradiated and the size of a light condensing point can thereby be arbitrarily changed.

Further, the formulas in the calculation method described above may include an initial value, but an initial phase $\theta_m'$ calculated by the following formula (4) may be added after a kinoform calculation.

[Formula 4]

$$\theta'_m = \theta_m + \delta_{initial} \quad (4)$$

In addition, the initial phase $\theta_m'$ may be for adjustment of aberration correction, beam shaping, beam spread, etc.

Further, in the calculation method described above, the wavelength (design wavelength) of the modulated light L2 suffices with a wavelength included in a range that allows modulation by the spatial light modulator 20, and is not at all limited by other requirements.

Further, the value of an intensity of the light L1 used in the calculation method described above may be either of a theoretical value and an experimental value. Here, it is desirable that the intensity distribution in a section perpendicular to the optical axis of the light L1 is nearly uniform. Where the intensity distribution of the light L1 is not uniform, it is necessary to design a kinoform by calculation including intensity distribution information of the light L1. The intensity distribution of the light L1 at this time is desirably an intensity distribution obtained on a plane that is conjugate to the phase modulation plane 20a.

In addition, a kinoform to be displayed on the phase modulation plane 20a can also be calculated by various methods, in addition to the above-described calculation method by reverse propagation. For example, a kinoform may be calculated by use of a calculation method for which Fresnel diffraction is applied to a common iteration method (for example, the GS method) or the like.

Here, the rear optical system 12A will be further described. When irradiating the observation object B with light, it is indeed possible that the rear optical system 12A is omitted when the light condensing point is large and the irradiation region is wide, however, in some cases, such as, for example, a case of light irradiation in a microscope, it is desired to have a small light condensing point and efficiently condense light into a narrow region. However, with only the phase modulation type spatial light modulator 20, its phase resolution and spatial resolution are not sufficient in some cases, it is difficult in such a case to generate a sufficiently small light condensing point. Thus, it is desirable to construct the rear optical system 12A using a lens having a high numerical aperture (NA).

Moreover, in such a case, it is desirable to use a Kepler type afocal optical system (4f optical system) and to provide a rear lens of this optical system as an objective lens. The rear optical system 12A of the present embodiment constitutes a Kepler type afocal system, and the optical distance between the front lens 12a and the rear lens 12b is substantially equal to a sum ($f_1+f_2$) of a focal length $f_1$ of the front lens 12a and a focal length $f_2$ of the rear lens 12b. Further, because the rear optical system 12A described above is an optical system that is telecentric on both sides, a focal plane of the objective lens (rear lens 12b) is in a conjugate relationship with the phase modulation plane 20a of the spatial light modulator 20. In addition, a zeroth-order light component of a Fourier optical system remains as background noise, but in the rear optical system 12A of the present embodiment, such noise is negligibly small as compared with a light condensing point.

Here, the reduction ratio M of the 4f optical system is determined by the following formula (5).

[Formula 5]

$$M = f_2/f_1 \quad (5)$$

Because the distance L from the spatial light modulator 20 to the conjugate plane is as follows,

[Formula 6]

$$L = 2(f_1+f_2) \quad (6)$$

an optimal combination of the front lens 12a and the rear lens 12b can be determined based on these formulas (5) and (6), and the optical system can be optimized.

On the other hand, the position of a light condensing point in the optical axis direction is unambiguously determined by a kinoform design value and the reduction ratio M. That is, where the design focal length of the kinoform is provided as z, the light condensing point is located at a distance of $\Delta z$ ($=z\times M$) from the focal plane of the rear lens 12b. This relationship holds similarly even when z is negative.

In addition, the relationship described above holds even if the interval between the rear lens 12b and the phase modulation plane 20a changes, but when the interval greatly changes, it is preferable to determine $\Delta z$ including a calculation of a combined focal length. This is the same even when the rear optical system 12A constitutes a Kepler type afocal system. Such $\Delta z$ is determined, for example, as in the following.

Where the focal length of a Fresnel type kinoform that is displayed on the phase modulation plane 20a is provided as $f_{SLM}$, the focal length of the front lens 12a is provided as $f_1$, the focal length of the rear lens 12b is provided as $f_2$, the distance between the phase modulation plane 20a and the front lens 12a is provided as $f_1$, and the distance between the front lens 12a and the rear lens 12b is provided as $f_1+f_2$, a combined focal length f' of the Fresnel type kinoform and the front lens 12a is calculated by the following formula (7).

[Formula 7]

$$\frac{1}{f'} = \frac{1}{f_{SLM}} + \frac{1}{f_1} - \frac{f_1}{f_{SLM}f_1} \quad (7)$$

Similar to the above, the combined focal length f of the combined focal length f' and the rear lens 12b is calculated by the following formula (8).

[Formula 8]

$$\frac{1}{f} = \frac{1}{f'} + \frac{1}{f_2} - \frac{f_1+f_2}{f'f_2} \quad (8)$$

Moreover, $\Delta z$ is calculated by the following formula (9).

[Formula 9]

$$\Delta z = f - f_2 \quad (9)$$

In addition, in the rear optical system 12A of the present embodiment, each of the front lens 12a and the rear lens 12b may consist of a single lens, or each lens may consist of a plurality of lenses. Further, the rear optical system 12A may include another lens in addition to the front lens 12a and the rear lens 12b. In that case, it is preferable to include the focal length of the other lens in a calculation of the combined focal length f described above. Further, the rear optical system 12A may include, in addition to the front lens 12a and the rear lens 12b, optical components (for example, a beam splitter, a wave plate, a polarizer, a scanner, etc.) other than lenses to such an extent that large wavefront aberration does not occur.

As described above, in the optical observation system 1A of the present embodiment that causes the phase modulation plane 20a to display a Fresnel type kinoform, the light condensing position of the modulated light L2 on the observation object B changes in the optical axis direction according to the configuration of the Fresnel type kinoform. In such a case, for obtaining a clear observation image in the detector 15b, it is desirable to move the focal position of the imaging optical system 15 in response to a change in the light condensing position of the modulated light L2.

Therefore, in the optical observation system 1A of the present embodiment, the mechanism 16a of the optical system moving mechanism 16 moves the imaging lens 15a of the imaging optical system 15 in the optical axis direction of the observation target light L3. Moreover, the mechanism 16a is controlled by a control signal S3 from the control section 19 such that the focal position of the imaging lens 15a changes in response to a change in the light condensing position of the modulated light L2 by a kinoform (typically, such that the focal position of the imaging lens 15a approximates the light condensing position of the modulated light L2). In the present embodiment, because the light condensing position of the modulated light L2 by a kinoform can be instantaneously calculated based on a kinoform provided by the control section 19, such control is enabled.

In addition, the control section 19 may have stored a Fresnel type kinoform used for irradiating the observation object B with the modulated light L2, and control the optical system moving mechanism 16, based on the stored Fresnel type kinoform, such that the focal position of the imaging optical system 15 changes in response to a change in the light condensing position of the irradiated modulated light L2. For example, when the state of a processed portion is observed in laser processing, the control section 19 may have stored a Fresnel type kinoform used for processing the observation object B (processing object), and after the processing ends, may control the optical system moving mechanism 16, based on the stored Fresnel type kinoform, such that the focal position of the imaging optical system 15 changes in response to a change in the light condensing position of the irradiated modulated light L2 so as to observe the processed portion.

Further, it is preferable that the optical distance from the imaging lens 15a to the detector 15b of the imaging optical system 15 is substantially equal to the focal length of the imaging lens 15a or close to that focal length. Thus, with a movement of the imaging lens 15a described above, the mechanism 16b of the optical system moving mechanism 16 is controlled by a control signal S4 from the control section 19 so that the detector 15b moves with the same direction and movement amount as those of the imaging lens 15a.

According to the optical observation system 1A of the present embodiment having the configuration described above, when the light condensing position of the modulated light L2 changes in the optical axis direction, the to-be-observed light L3 (observation optical image) can be automatically focused on the light condensing position in an irradiation portion without bothering an operator. Thus, according to the optical observation system 1A of the present embodiment, even when the light condensing position of the modulated light L2 is changed in the optical axis direction, an observation optical image of the irradiated portion can be easily obtained.

Further, in the optical observation system 1A of the present embodiment, the imaging optical system 15 is moved using a mechanical mechanism such as the optical system moving mechanism 16. Accordingly, as compared with when, for example, another spatial light modulation element is provided in the imaging optical system to adjust the focal position, because this allows a configuration using a device, such as a piezoelectric element or an electric stage, the response speed of which is sufficiently faster than that of the spatial light modulation element, an adjustment of the focal position can be quickly performed. Further, according to the optical observation system 1A, because it is not necessary to add optical components, the device scale can be held to be small.

Further, according to the optical observation system 1A of the present embodiment, because the shape of irradiation light can be freely controlled by use of the spatial light modulator 20, even when the light L1 is changed in characteristics, simply changing a kinoform that the phase modulation plane 20a is caused to display can respond thereto, which is convenient because a change in the optical system such as a lens is not necessary. Further, when switching the rear lens (objective lens) 12b in, for example, an optical microscope, simply changing a kinoform that the phase modulation plane 20a is caused to display can respond thereto, which can make a change in the other optical system unnecessary. Further, an optical axis adjustment of the front optical system 11 and the rear optical system 12A with the phase modulation plane 20a can also be performed by only an adjustment of the kinoform and is therefore considerably easy.

Further, according to the optical observation system 1A of the present embodiment, because the phase diffraction plane 20a is caused to display a Fresnel diffraction type kinoform, the variable range of the light condensing position in the optical axis direction of modulated light L2 can be expanded, and the effect of a zeroth-order light component can be reduced to suppress photobleaching in a fluorescence microscope to be small. Further, according to the optical observation system 1A, the effect of zeroth-order light instantaneously intensified at the time of switching of kinoforms on the phase modulation plane 20a can be effectively reduced.

Further, in this optical observation system 1A, a light intensity distribution of the modulated light L2 may be experimentally measured, and the measurement result may be fed back to the design of kinoforms. Illumination that conforms to the demand of the user side and in a highly versatile mode is thereby enabled. In addition, when measuring a light intensity distribution of the modulated light L2, it is preferable to provide a measuring device at a position where the image plane same as a light condensing plane of the modulated light L2 can be observed.

Further, according to this optical observation system 1A, illumination light having high intensity uniformity and a continuous sectional shape such as a straight line, which is difficult to be realized with a Fourier type kinoform, can be easily realized. Further, according to this optical observation system 1A, a region of the observation object B to be simultaneously illuminated is not limited to a planar region, and a three-dimensional region can also be simultaneously illuminated.

Further, when the optical axis of the modulated light L2 with which the observation object B is irradiated is changed, this can be changed without moving the rear optical system 12A by only changing a kinoform to be displayed on the phase modulation plane 20a. Thus, such a change in optical axis can also be easily performed. Further, the numerical aperture (NA) can also be easily changed without replacing the optical system 12A. Further, an adjustment of the light amount of the modulated light L2 with which the observation object B is irradiated is also easy.

Further, in the optical observation system 1A, by only changing a kinoform to be displayed on the phase modulation plane 20a, the light condensing position of the modulated light L2 in the optical axis direction can be changed without moving the optical system 12A. Thus, according to this optical observation system 1A, a change in irradiating position of the modulated light L2 in the optical axis direction can be easily performed by a simple configuration, which enables downsizing of the device.

In addition, this optical observation system 1A can also be applied to SIM (Structured Illumination Microscopy), which is recently being actively researched. In addition, the observation target light L3 from the observation object B is not limited to light transmitted through the observation object B, and may be fluorescence generated by irradiation with the modulated light L2, and the optical observation system 1A can be adopted to a florescence observation device.

Further, in the optical observation system 1A, the optical system moving mechanism 16 may be configured such as to move the imaging optical system 15 three-dimensionally including a plane (XY plane) perpendicular to the optical axis, without being limited to moving the imaging optical system 15 in the optical axis direction. When a Fresnel type kinoform is displayed on the phase modulation plane 20a, the modulated light L2 can be three-dimensionally irradiated onto the observation object B, which thus enables moving the imaging optical system 15 three-dimensionally according to the light condensing position of the three-dimensionally irradiated modulated light L2.

Further, as in the present embodiment, it is preferable that the imaging optical system 15 images the observation target light L3 that is transmitted through the observation object B out of modulated light that is transmitted through the observation object B and modulated light that is reflected on the observation object B. In this case, the rear optical system 12A (irradiation optical system) for irradiating the observation object B with the modulated light L2 and the imaging optical system 15 for imaging the observation target light L3 transmitted through the observation object B can be configured independently of each other. Thus, it is easy to move the imaging optical system 15 without influencing the rear optical system 12A, and the configuration of the optical observation system 1A for making the focal position of the imaging optical system 15 approximate the light condensing position of the modulated light L2 can be easily realized. Further, the rear optical system 12A and the imaging optical system 15 can be provided as mutually different configurations, and therefore can appropriately use optical components (lens, mirror, filter, etc.) having different functions, respectively.

(First Modification)

Figure 7:
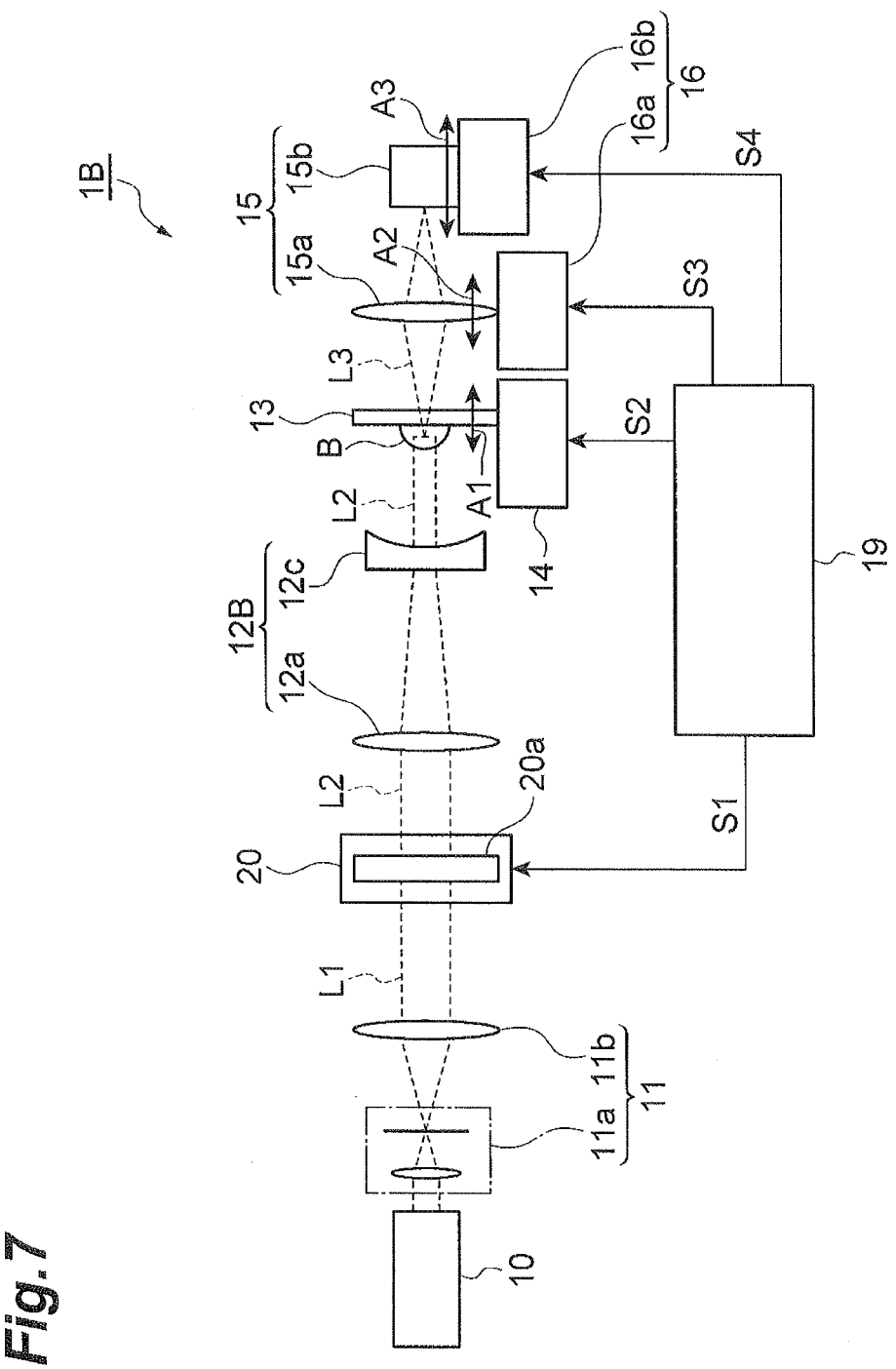
FIG. 7 is a view showing a configuration of an optical observation system serving as a first modification.

FIG. 7 is a view showing a configuration of an optical observation system 1B as a first modification of the above-described embodiment. The optical observation system 1B includes a rear optical system 12B in place of the rear optical system 12A of the above-described embodiment. In addition, configurations other than the rear optical system 12B are the same as those of the above-described embodiment.

The rear optical system 12B of the present modification has a front lens 12a and a rear lens 12c. The front lens 12a and the rear lens 12c constitute a so-called Galilean type afocal system, and the rear lens 12c is a concave lens. Even the optical observation system 1B having such a configuration can provide the same advantageous effects as those of the optical observation system 1A described above. Here, in the present modification, it is necessary to invert the positive and negative of a phase distribution of a kinoform to be displayed on the phase modulation plane 20a, and also, because the rear lens 12c is provided as a concave lens, an ordinary objective lens cannot be used therefor. In addition, in the present modification, the method for calculating Δz is the same as that of the above-described embodiment.

(Second Modification)

Figure 8:
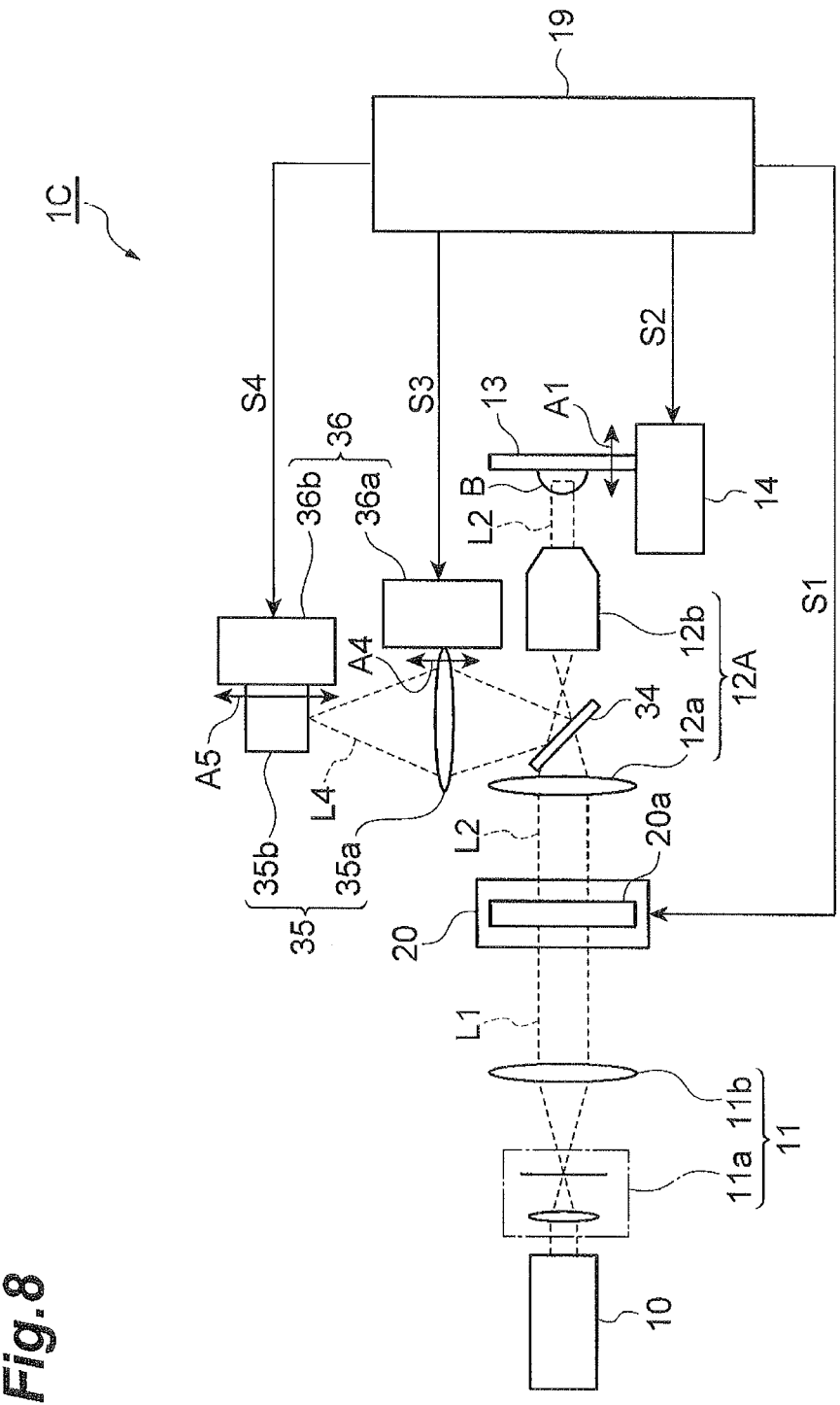
FIG. 8 is a view showing a configuration of an optical observation system serving as a second modification.

FIG. 8 is a view showing a configuration of an optical observation system 1C as a second modification of the above-described embodiment. The optical observation system 1C includes a beam splitter 34, an imaging optical system 35, and an optical system moving mechanism 36 in place of the imaging optical system 15 and the optical system moving mechanism 16 of the optical observation system 1A of the above-described embodiment. These are provided on the same side as the observation object B with respect to the stage 13 that supports the observation object B, and provided so as to acquire an image of observation target light L4 (observation optical image) reflected on the observation object B.

The beam splitter 34 is disposed on an optical path of the modulated light L2 between the front lens 12a and the rear lens 12b of the rear optical system 12A. The beam splitter 34 transmits the modulated light L2 having reached through the front lens 12a from the phase modulation plane 20a, toward the rear lens 12b. Further, the beam splitter 34 reflects the observation target light L4 (observation optical image) having reached via the rear lens 12b after being reflected on the observation object B, toward the imaging optical system 35.

The imaging optical system 35 includes an imaging lens 35a and a detector (imaging device) 35b. One surface of the imaging lens 35a is optically coupled to the beam splitter 34, and the other surface is optically coupled to a photodetecting plane of the detector 35b. The imaging lens 35a forms an image of the observation target light L4 reflected on the observation object B, toward the detector 35b. The detector 35b takes an optical image of the observation target light L4 regarding the observation object B and generates image data.

The detector 35b may be any of a one-dimensional sensor, a two-dimensional image sensor, and a spectroscope, or may use these at the same time. In addition, if the detector 35b is a one-dimensional sensor, a pinhole may be provided between the imaging lens 35a and the detector 35b to constitute a confocal system. Further, between the imaging lens 35a and the detector 35b, an optical system such as a relay lens or an optical component such as a filter may be provided.

The optical system moving mechanism 36 is a mechanism for moving the imaging optical system 35 along an optical axis direction of the observation target light L4 in the imaging optical system 35. The optical system moving mechanism 36 includes a mechanism 36a for moving the imaging lens 35a along the optical axis direction (arrow A4 in the figure) of the observation target light L4 in the imaging lens 35a and a mechanism 36b for moving the detector 35b along the optical axis direction (arrow A5 in the figure) of the observation target light L4 in the detector 35b.

The mechanism 36a moves the imaging lens 35a with a direction (whether being the front direction or rear direction) and movement amount instructed by a control signal S3 provided from the control section 19. The mechanism 36b moves the detector 35b with a direction (whether being the front direction or rear direction) and movement amount instructed by a control signal S4 provided from the control section 19.

The mechanism 36a is controlled by a control signal S3 from the control section 19 such that the focal position of the imaging lens 35a changes in response to a change in the light condensing position of the modulated light L2 by a kinoform. Further, with a movement of the imaging lens 35a, the mechanism 36b is controlled by a control signal S4 from the control section 19 so that the detector 35b moves with the same direction and movement amount as those of the imaging lens 35a.

According to the optical observation system 1C of the present modification having such a configuration, when the light condensing position of the modulated light L2 changes in the optical axis direction, the observation target light L4 (observation optical image) can be automatically focused on the light condensing position in an irradiation portion without bothering an operator. Thus, according to the optical observation system 1C of the present modification, even when the light condensing position of the modulated light L2 is changed in the optical axis direction, an observation optical image of the irradiation portion can be easily obtained.

(Third Modification)

Figure 9:
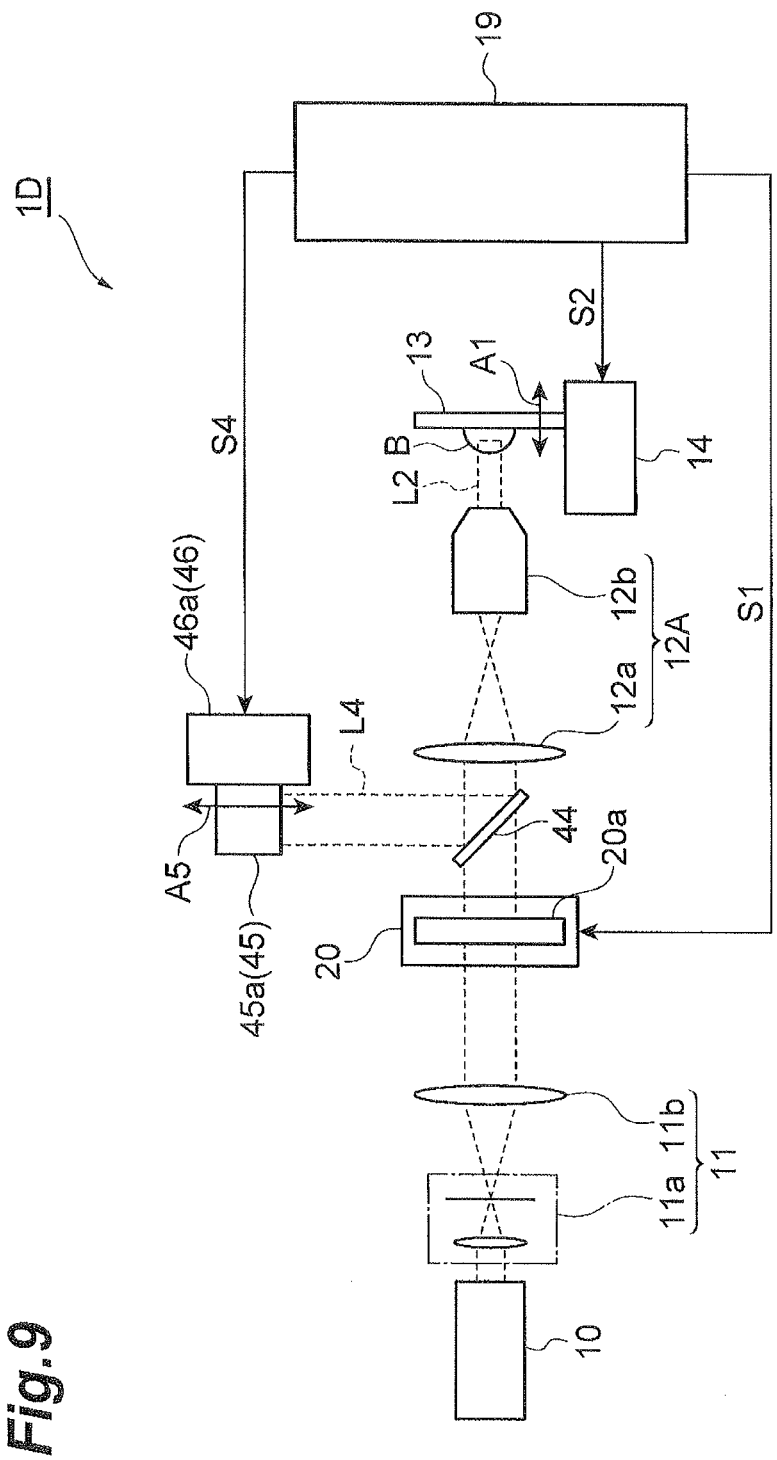
FIG. 9 is a view showing a configuration of an optical observation system serving as a third modification.

FIG. 9 is a view showing a configuration of an optical observation system 1D as a third modification of the above-described embodiment. The optical observation system 1D includes a beam splitter 44, an imaging optical system 45, and an optical system moving mechanism 46 in place of the imaging optical system 15 and the optical system moving mechanism 16 of the optical observation system 1A of the above-described embodiment. Similar to the second modification, these are provided on the same side as the observation object B with respect to the stage 13 that supports the observation object B, and provided so as to acquire an image of observation target light L4 (observation optical image) reflected on the observation object B.

The beam splitter 44 is disposed on an optical path of the modulated light L2 between the spatial light modulator 20 and the front lens 12a of the rear optical system 12A. The beam splitter 44 transmits the modulated light L2 output from the phase modulation plane 20a, toward the front lens 12a. Further, the beam splitter 44 reflects the observation target light L4 (observation optical image) having reached via the rear lens 12b and the front lens 12a after being reflected on the observation object B, toward the imaging optical system 45.

The imaging optical system 45 includes a detector 45a. The detector 45a takes an optical image of the observation target light L4 regarding the observation object B and generates image data. The detector 45a may be any of a one-dimensional sensor, a two-dimensional image sensor, and a spectroscope, or may use these at the same time. In addition, between the beam splitter 44 and the detector 45a, an optical system such as a relay lens or an optical component such as a filter may be provided.

The optical system moving mechanism 46 is a mechanism for moving the imaging optical system 45 along an optical axis direction of the observation target light L4 in the imaging optical system 45. The optical system moving mechanism 46 includes a mechanism 46a for moving the detector 45a along the optical axis direction (arrow A5 in the figure) of the observation target light L4 in the detector 45a.

The mechanism 46a moves the detector 45a with a direction (whether being the front direction or rear direction) and movement amount instructed by a control signal S4 provided from the control section 19. The mechanism 46a is controlled by a control signal S4 from the control section 19 such that the focal position of the detector 45a changes in response to a change in the light condensing position of the modulated light L2 by a kinoform.

According to the optical observation system 1D of the present modification having such a configuration, when the light condensing position of the modulated light L2 changes in the optical axis direction, the observation target light L4 (observation optical image) can be automatically focused on the light condensing position in an irradiation portion without bothering an operator. Thus, according to the optical observation system 1D of the present modification, even when the light condensing position of the modulated light L2 is changed in the optical axis direction, an observation optical image of the irradiation portion can be easily obtained.

Although a preferred embodiment of an optical observation system according to the present invention has been described above, the present invention is not limited to the above-described embodiment, and can be variously modified within the scope of the present invention. For example, in the above-described embodiment and respective modifications, a rear optical system is provided between the spatial light modulator and the observation object, the rear optical system may be omitted by condensing modulated light according to only a Fresnel type kinoform displayed on the phase modulation plane.

Further, in the above-described embodiment and respective modifications, the imaging optical system moving mechanism is installed for both of the imaging lens and the detector, the imaging optical system moving mechanism may be installed only for either one of the imaging lens and the detector.

Further, as described in the above-described embodiment and respective modifications, when the detector of the imaging optical system is a one-dimensional sensor, a pinhole may be provided between the imaging lens and the detector to constitute a confocal system. Further, between the imaging lens and the detector, an optical system such as a relay lens and an optical component such as a filter may be provided. Moreover, when an optical component such as the pin-hole, relay lens, or filter is provided, it is preferable that a mechanism for moving the optical component in the optical axis direction is further provided.

An optical observation system according to the above-described embodiment, which is an optical observation system for imaging observation target light from an observation object, includes a light source outputting light, a spatial light modulator having a phase modulation plane including a plurality of two-dimensionally arrayed regions, displaying a Fresnel type kinoform on the phase modulation plane, generating modulated light by modulating the phase of the light for each of the plurality of regions, and outputting the modulated light to the observation object, an imaging optical system imaging the observation target light from the observation object, an optical system moving mechanism moving the imaging optical system, and a control section controlling the optical system moving mechanism such that a focal position of the imaging optical system changes in response to a change in light condensing position of the modulated light due to the Fresnel type kinoform.

Further, the optical observation system may be configured such that the imaging optical system images the observation target light transmitted through the observation object. In this case, an irradiation optical system for irradiating the observation object with the modulated light and the imaging optical system for imaging the modulated light transmitted through the observation object can be configured independently of each other. Thus, it is easy to move the imaging optical system without influencing the irradiation optical system, and the configuration of the optical observation system described above can be easily realized.

Further, the optical observation system may be configured so as to further include an observation object moving mechanism for moving the observation object in an optical axis direction of the observation target light.

Further, the optical observation system may be configured such that the imaging optical system includes an imaging lens, and the optical system moving mechanism moves the imaging lens.

Further, the optical observation system may be configured such that the imaging optical system includes an imaging device, and the optical system moving mechanism moves the imaging device.

Further, the optical observation system may be configured such that the control section, during output of the modulated light to the observation object, controls the optical system moving mechanism such that a focal position of the imaging optical system changes based on the Fresnel type kinoform which is displayed on the phase modulation plane.

Further, the optical observation system may be configured such that the control section, after output of the modulated light to the observation object, controls the optical system moving mechanism such that a focal position of the imaging optical system changes based on the Fresnel type kinoform which has been stored in advance.

INDUSTRIAL APPLICABILITY

The present invention is applicable as an optical observation system capable of easily obtaining an observation optical image of a irradiation portion even when the light condensing position of modulated light is changed in the optical axis direction.

REFERENCE SIGNS LIST 1A, 1B, 1C, 1D—optical observation system, 10—light source, 11—front optical system, 11a—spatial filter, 11b—collimator lens, 12A, 12B—rear optical system, 12a—front lens, 12b, 12c—rear lens, 13—stage, 14—stage moving mechanism, 15, 35, 45—imaging optical system, 15a, 35a—imaging lens, 15b, 35b, 45a—detector, 16, 36, 46—optical system moving mechanism, 19—control section, 20—spatial light modulator, 20a—phase modulation plane, 34, 44—beam splitter, B—observation object, L1—light output from light source, L2—modulated light, L3, L4—observation target light, S1, S2, S3, S4—control signal.

The invention claimed is:

1. An optical observation system for imaging observation target light from an observation object, comprising:
a light source configured to output light;
a spatial light modulator comprising a phase modulation plane including a plurality of two-dimensionally arrayed regions, and configured to display a Fresnel type kinoform on the phase modulation plane, and modulate the light in phase in each of the plurality of regions to generate modulated light, and configured to output the modulated light to the observation object; an optical system configured to image the observation target light from the observation object;
an optical system moving mechanism installed for the optical system and configured to move the optical system; and
a controller configured to control a light condensing position of the modulated light by controlling the Fresnel type kinoform displayed on the phase modulation plane of the spatial light modulator,
calculate a calculated focal position on the basis of the Fresnel type kinoform, and
control a focal position of the optical system based on said calculated focal position such that the focal position of the optical system changes in response to a change in the light condensing position of the modulated light by the Fresnel type kinoform.

2. The optical observation system according to claim 1, wherein the optical system images the observation target light transmitted through the observation object.

3. The optical observation system according to claim 1, further comprising an observation object moving mechanism configured to move the observation object in an optical axis direction of the observation target light.

4. The optical observation system according to claim 1, wherein the optical system comprises an imaging lens, and the optical system moving mechanism moves the imaging lens.

5. The optical observation system according to claim 1, wherein the optical system comprises an imaging device, and the optical system moving mechanism moves the imaging device.

6. The optical observation system according to claim 1, wherein the controller, during output of the modulated light to the observation object, controls the optical system moving mechanism such that a focal position of the optical system changes based on the Fresnel type kinoform which is displayed on the phase modulation plane.

7. The optical observation system according to claim 1, wherein the controller, after output of the modulated light to the observation object, controls the optical system moving mechanism such that a focal position of the optical system changes based on the Fresnel type kinoform which has been stored in advance.

8. An optical observation method for imaging observation target light from an observation object, comprising:

by a spatial light modulator comprising a phase modulation plane including a plurality of two-dimensionally arrayed regions, modulating light output from a light source in phase in each of the plurality of regions based on a Fresnel type kinoform to generate modulated light;

irradiating the observation object with the modulated light;

by an optical system, imaging the observation target light from the observation object;

controlling a light condensing position of the modulated light by controlling the Fresnel type kinoform displayed on the phase modulation plane of the spatial light modulator:

calculating a calculated focal position on the basis of the Fresnel type kinoform; and controlling a focal position of the optical system based on said calculated focal position such that the focal position of the optical system changes in response to a change in the light condensing position of the modulated light by the Fresnel type kinoform, the optical system moving mechanism being installed for the optical system and configured to move the optical system.

* * * * *